US009601131B2

(12) United States Patent
Chen et al.

(10) Patent No.: US 9,601,131 B2

(45) Date of Patent: Mar. 21, 2017

(54) SOUND PROCESSING DEVICE AND METHOD

(71) Applicant: HTC Corporation, Taoyuan (TW)

(72) Inventors: Lei Chen, Taoyuan (TW); Chun-Min Lee, Taoyuan (TW); Hann-Shi Tong, Taoyuan (TW); Chih-Wei Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/749,670

(22) Filed: Jun. 25, 2015

(65) Prior Publication Data

US 2016/0379664 A1 Dec. 29, 2016

(51) Int. Cl.

| | |
|---|---|
| ***H04B 15/00*** | (2006.01) |
| ***G10L 21/0264*** | (2013.01) |
| ***H04R 1/32*** | (2006.01) |
| ***G10L 21/0388*** | (2013.01) |
| *G10L 21/0216* | (2013.01) |

(52) U.S. Cl.

CPC ...... *G10L 21/0264* (2013.01); *G10L 21/0388* (2013.01); *H04R 1/326* (2013.01); *G10L 2021/02166* (2013.01); *H04R 2410/01* (2013.01)

(58) Field of Classification Search

CPC ........................ G10L 21/0264; G10L 21/0388

See application file for complete search history.

(56) References Cited

U.S. PATENT DOCUMENTS

| | | | | |
|---|---|---|---|---|
| 8,180,064 | B1 * | 5/2012 | Avendano | G10L 21/0232 381/71.1 |
| 2003/0063759 | A1 * | 4/2003 | Brennan | H04R 3/005 381/92 |
| 2008/0159559 | A1 | 7/2008 | Akagi et al. | |

* cited by examiner

*Primary Examiner* — Simon King

(74) *Attorney, Agent, or Firm* — CKC & Partners Co., Ltd.

(57) ABSTRACT

A sound processing device is provided. The sound processing device includes a microphone array and a post filtering module. The microphone array includes microphones aiming to different directions and configured for receiving sound signals. The post filtering module is configured for receiving the sound signals from the microphone array, filtering the sound signals to generate groups of filtered signals each corresponding to one of the sound signals, wherein each of the filtered signals within a group corresponds to one of different frequency bands, generating band signals each based on a comparison of an intensity of one of the filtered signals that corresponds to the same one of the frequency bands in each group of the filtered signals and a noise intensity correlation between the frequency bands and adding the band signals to generate an output sound signal.

19 Claims, 7 Drawing Sheets

SOUND PROCESSING DEVICE AND METHOD

BACKGROUND

Field of Invention

The present invention relates to a signal processing technology. More particularly, the present invention relates to a sound processing device and method of the same.

Description of Related Art

The recording of microphones always suffers from the environment noise such as traffic noise or wind noise. Those noises have large low frequency loudness and impact the sound quality. Many technologies using noise cancellation or suppression to remove or suppress the noise are complicated. The hardware for implementing such technologies is power-consuming such that the battery life is reduced.

Accordingly, what is needed is a sound processing device and method of the same to address the above issues.

SUMMARY

The invention provides a sound processing device. The sound processing device includes a microphone array and a post filtering module. The microphone array includes a plurality of microphones aiming to different directions and configured for receiving a plurality of sound signals. The post filtering module is configured for receiving the sound signals from the microphone array, filtering the sound signals to generate a plurality of groups of filtered signals each corresponding to one of the sound signals, wherein each of the filtered signals within a group corresponds to one of a plurality of different frequency bands, generating a plurality of band signals each based on a comparison of an intensity of one of the filtered signals that corresponds to the same one of the frequency bands in each group of the filtered signals and a noise intensity correlation between the frequency bands; and adding the band signals to generate an output sound signal.

Yet another aspect of the present invention is to provide a sound processing method. The sound processing method includes the steps outlined below. A plurality of sound signals are received by a plurality of microphones included in a microphone array aiming to different directions. The sound signals are filtered to generate a plurality of groups of filtered signals each corresponding to one of the sound signals, wherein each of the filtered signals within a group corresponds to one of a plurality of different frequency bands. Each of a plurality of band signals is generated based on a comparison of an intensity of one of the filtered signals that corresponds to the same one of the frequency bands in each group of the filtered signals and a noise intensity correlation between the frequency bands. The band signals are added to generate an output sound signal.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
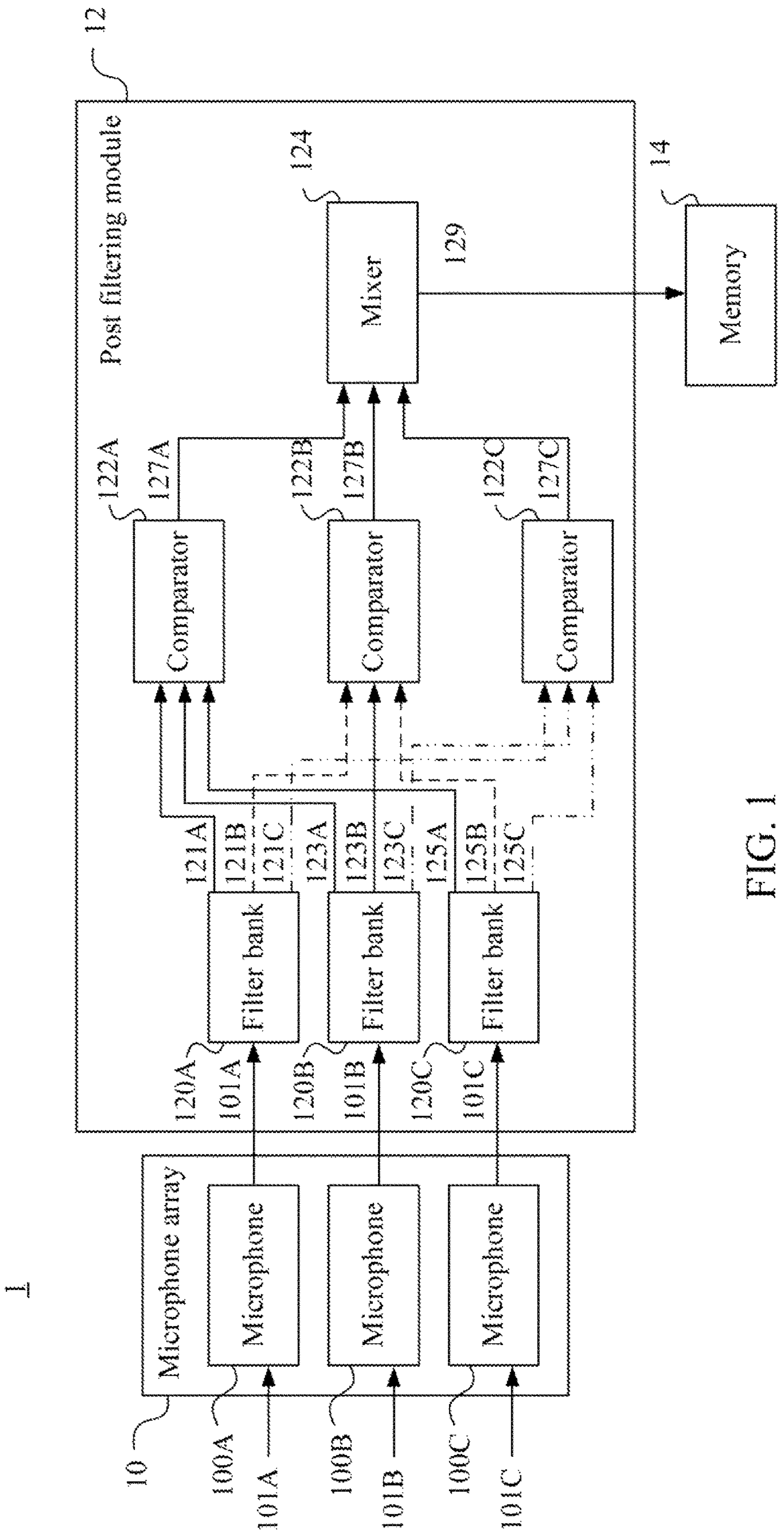
FIG. 1 is block diagram of a sound processing device in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is block diagram of a sound processing device 1 in an embodiment of the present invention. The sound processing device 1 includes a microphone array 10 and a post filtering module 12.

The microphone array 10 includes a plurality of microphones 100A-100C, In FIG. 1, three microphones 100A-100C are exemplarily illustrated, but the present invention is not limited thereto.

Figure 2:
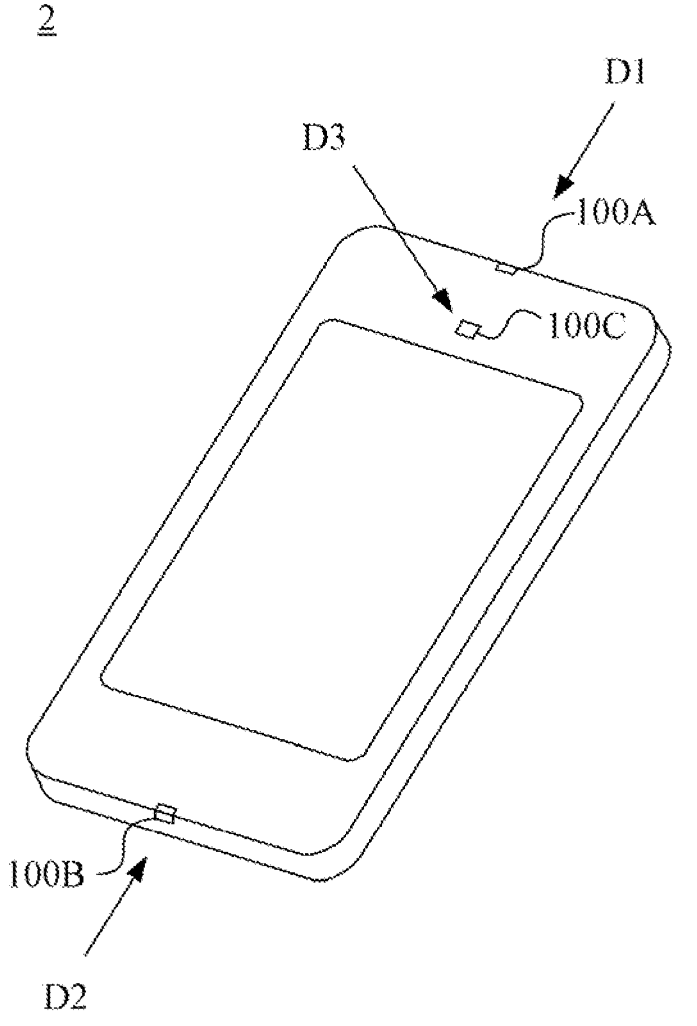
FIG. 2 is a diagram of an exemplary electronic device in an embodiment of the present invention.

Reference is now made to FIG. 2 together with FIG. 1 at the same time, in which FIG. 2 is a diagram of an exemplary electronic device 2 in an embodiment of the present invention. In different embodiments, the electronic device 2 can be such as, but not limited to a smartphone, a tablet PC or other portable electronic devices.

In an embodiment, the microphones 100A-100C are disposed at different positions of the electronic device 2, such as a front side, a rear side and a top side respectively. As a result, the microphones 100A-100C aim to different directions D1, D2 and D3. In an embodiment, an angle between each two of the directions of the microphones, e.g. the microphones 100A and 100B, is larger than 90 degrees.

The microphones 100A-100C are configured for receiving a plurality of sound signals 101A-101C. In an embodiment, since the microphones 100A-100C aim to different directions, the sound signals 101A-101C from different directions can be received.

In an embodiment, the post filtering module 12 includes a plurality of filter banks 120A-120C, a plurality of comparators 122A-122C and a mixer 124. In an embodiment, the number of the filter banks 120A-120C corresponds to the number of the microphones 100. In an embodiment, the number of the comparators 122A-122C corresponds to the number of the filter banks 120A-120C.

Each of the filter banks 120A-120C is configured for receiving and filtering one of the sound signals 101A-101C to generate one group of filtered signals. For example, the filter bank 120A filters the sound signal 101A to generate a group of filtered signals 121A-121C. The filter bank 120B filters the sound signal 101B to generate a group of filtered signals 123A-123C. The filter bank 120C filters the sound signal 101C to generate a group of filtered signals 125A-125C.

In an embodiment, each of the filter banks 120A-120C is a finite impulse response (FIR) filter. For an finite impulse response filter, when the input signal at different times includes x(n), x(n−1), . . . ,x(n−N) and the output signal is y(n), the relation therebetween is expressed as: $y(n)=h_0x(n)+h_1x(n-1)+ \ldots +h_Nx(n-N)$, wherein $h_i$ are the values of the impulse response at the i-th instant and can be determined according to different filtering scenarios.

As a result, each of the filter banks 120A-120C processes one of the sound signals 101A-101C directly on the time domain without the need of transformation between the time domain and the frequency domain.

It is noted that the filter banks implemented by finite impulse response filters are merely an example. Other appropriate digital filters operate on the time domain can be used.

Figure 3:
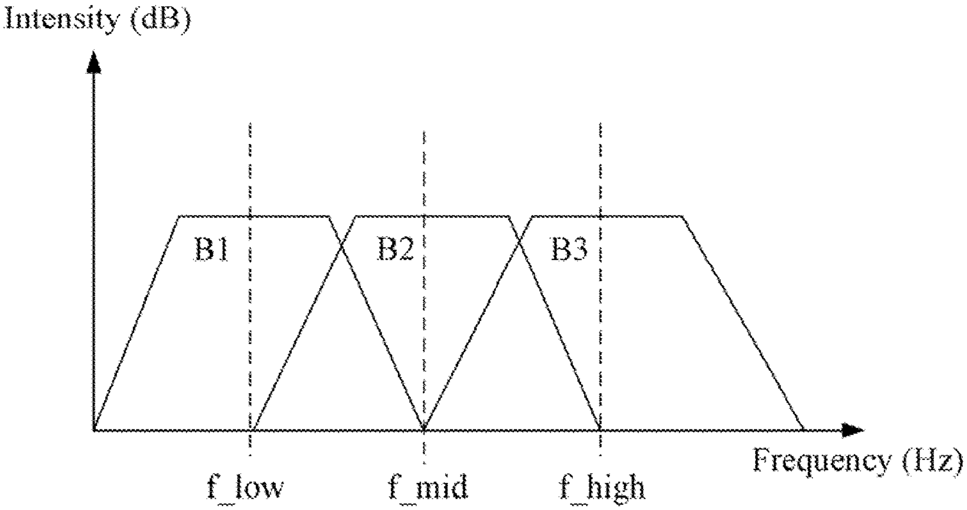
FIG. 3 is a diagram of three exemplary frequency bands that the signals are allowed to be passed through the filter bank in an embodiment of the present invention.

In an embodiment, the filtered signals in each group of the filtered signals correspond to different frequency bands, Reference is now made to FIG. 3, in which FIG. 3 is a diagram of three exemplary frequency bands B1-B3 that the signals are allowed to be passed through the filter bank 120A in an embodiment of the present invention. In FIG. 3, the horizontal axis corresponds to the signal frequency in the unit of such as, but not limited to hertz. The vertical axis corresponds to the intensity of the signal allowed to be passed in the unit of such as, but not limited to dB.

In an embodiment, the filtered signal 121A corresponds to the lowest frequency band 1 around a frequency f_low, the filtered signal 121B corresponds to the medium frequency band B2 around a frequency f_mid and filtered signal 121C corresponds to the highest frequency band B3 around a frequency f_high.

For a numerical example, in an embodiment, the filtered signal 121A corresponds to the frequency band B1 ranging below 100 hertz (Hz). The filtered signal 121B corresponds to the frequency band B2 ranging from above 100 hertz to below 2 kilohertz. The filtered signal 121C corresponds to the frequency band B3 ranging above 2 kilohertz. Furthermore, each group of the filtered signals includes one of the filter signals that correspond to the same frequency band. For example, the filtered signals 121A, 123A and 123B correspond to the same frequency band, such as the frequency band ranging below 100 hertz.

Each of the comparators 122A-122C is configured for receiving one of the filtered signals that correspond to a specific frequency band in each group of the filtered signals. For example, the comparator 122A receives the filtered signals 121A, 123A and 125A. The comparator 122B receives the filtered signals 121B, 123B and 125B. The comparator 122C receives the filtered signals 121C, 123C and 125C.

The comparators 122A-122C are further configured for comparing the intensity of the received filtered signals. Moreover, the comparators 122A-122C select one of the received filtered signals as outputted band signals 127A-127C respectively based on a noise intensity correlation of the specific frequency band.

Figure 4:
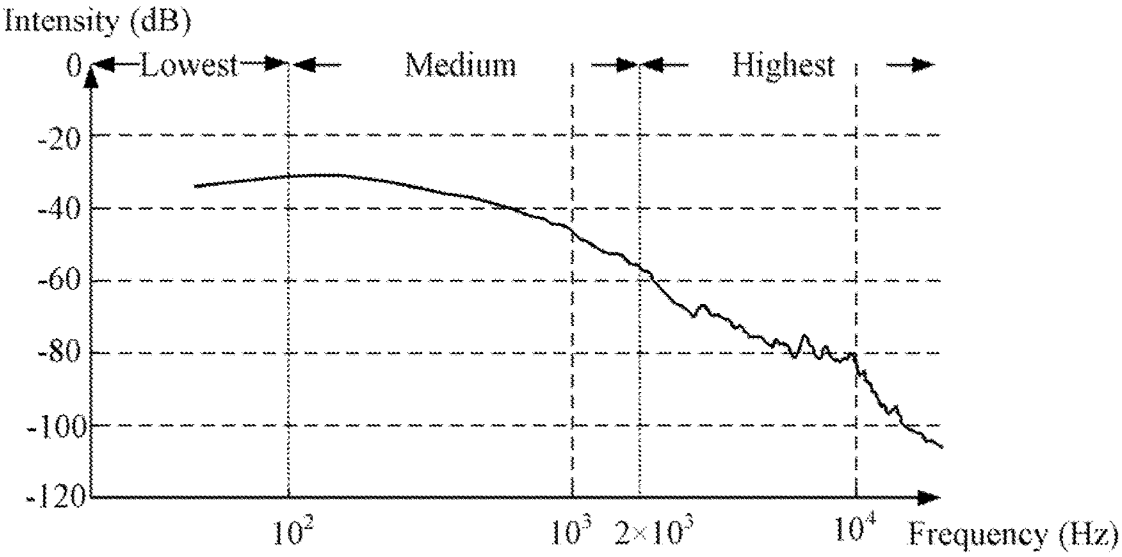
FIG. 4 is diagram of a signal spectrum of a noise illustrating the correlation of the noise intensity and the frequency bands in an embodiment of the present invention.

The operation mechanism of the comparators 122A-1220 is described in detail with the reference of FIG. 1 together with FIG. 4. FIG. 4 is diagram of a signal spectrum of a noise illustrating the correlation of the noise intensity and the frequency bands in an embodiment of the present invention.

As illustrated in FIG. 4, the x-axis of the diagram is the frequency (hertz) and the y-axis is the intensity (db), in which the numbers of the x-axis are represented as a log scale.

The spectrum of the noise signal reveals that the noise, such as the sound of the wind blow, tends to have a much larger intensity within a lower frequency band and gradually decrease in higher frequency ranges. In FIG. 4, the noise within the lowest frequency band below 100 hertz, which is labeled as "lowest", has the largest intensity. The noise within the highest frequency band above 2 kilohertz, which is labeled as "highest", has the lowest intensity. The noise within the medium frequency band above 100 hertz and below 2 kilohertz, which is labeled as "medium" has a medium intensity.

It is noted that the range of each of the frequency bands mentioned above is merely an example. In different embodiments, it is possible to use different proportions of the largest intensity of the noise to define the range of each of the frequency bands. For example, the highest frequency band can be defined by the range that the intensity of the noise is lower than 20% of its highest value. The lowest frequency band can be defined by the range that the intensity of the noise is larger than 80% of its highest value. Moreover, the medium frequency band can be defined by the range that the intensity of the noise is within 20%-80% of its highest value.

As a result, when the frequencies of a specific frequency band are lower, the noise intensity is higher such that the one of the received filtered signals having a lower intensity is selected.

Take the comparator 122A for example, the comparator 122A compares the intensity of the received filtered signals 121A, 123A and 125A corresponding to the lowest frequency band that is below 100 hertz. Since the noise intensity is highest according to the noise correlation between the frequency bands illustrated above, one of the filtered signals 121A, 123A and 125A that has the highest intensity is more likely to be influenced by the noise.

As a result, the comparator 122A selects one of the filtered signals 121A, 123A and 125A having the lowest intensity to be outputted as the band signal 127A.

On the other hand, when frequencies of a specific frequency band are higher, the noise intensity is lower such that the one of the received filtered signals having a larger intensity is selected.

Take the comparator 122C for example, the comparator 122C compares the intensity of the received filtered signals 121C, 123C and 125C corresponding to the highest frequency band that is above 2 kilohertz. Since the noise intensity is lowest according to the noise correlation between the frequency bands illustrated above, one of the filtered signals 121C, 1230 and 125C having the highest intensity is more likely to include the actual sound, e.g. voices of human speech.

As a result, the comparator 122C selects one of the filtered signals 121C, 123C and 125C having the highest intensity to be outputted as the band signal 127C.

Yet on the other hand, when frequencies of a specific frequency band are within a medium range, the noise intensity is medium such that the one of the received filtered signals having a medium intensity is selected.

Take the comparator 122B for example, the comparator 122B compares the intensity of the received filtered signals 121B, 123B and 125B corresponding to the medium frequency band that is above 100 hertz and below 2 kilohertz. Since the noise intensity is medium according to the noise correlation between the frequency bands illustrated above, one of the filtered signals 121B, 123B and 125B having the medium intensity is more likely to include the actual sound and have a lower influence from noise.

As a result, the comparator 122B selects one of the filtered signals 121B, 123B and 125B having the medium intensity to be outputted as the band signal 127B. In another embodiment, the comparator 122B may average the filtered signals 121B, 123B and 125B to generate the band signal 127B.

The mixer 124 is configured for adding the band signals 127A-127C to generate an output sound signal 129. In an embodiment, the sound processing device 1 further includes a memory 14 for storing the output sound signal 129.

Consequently, the sound processing device 1 uses the microphones 100A-100C aiming to different directions to receive the sound signals 101A-101C that include the sound information and noise from different directions. The filter banks 120A-120C further generate filtered signals corresponding to different frequency bands. The comparators 122A-122C further select the filtered signals corresponding to different frequency bands according to the noise correlation thereof to suppress the influence of the noise that is most possibly occurred in a relatively low frequency band such that a clearer outputted sound signal is obtained.

Moreover, in some technologies, the processing of the sound signal needs to transform the sound signal back and forth between the time domain and the frequency domain, which increases hardware complexity and is time-consuming. The sound processing device 1 in the present invention takes advantage of the filter banks 120A-120C operating on the time domain such that the sound processing device 1 has a higher signal-processing speed and is more power-saving.

It is noted that the number of the microphones 100A-100C, the filter banks 120A-120C and the comparators 122A-122C described above is merely an example. In an embodiment, the number of the filter banks can be two to correspond to two frequency bands. However, only one relative low frequency band and one relative high frequency band may be not able to efficiently remove the influence of noise or may remove too much of the signal. As a result, the number of the filter banks larger than three is recommended.

Figure 5:
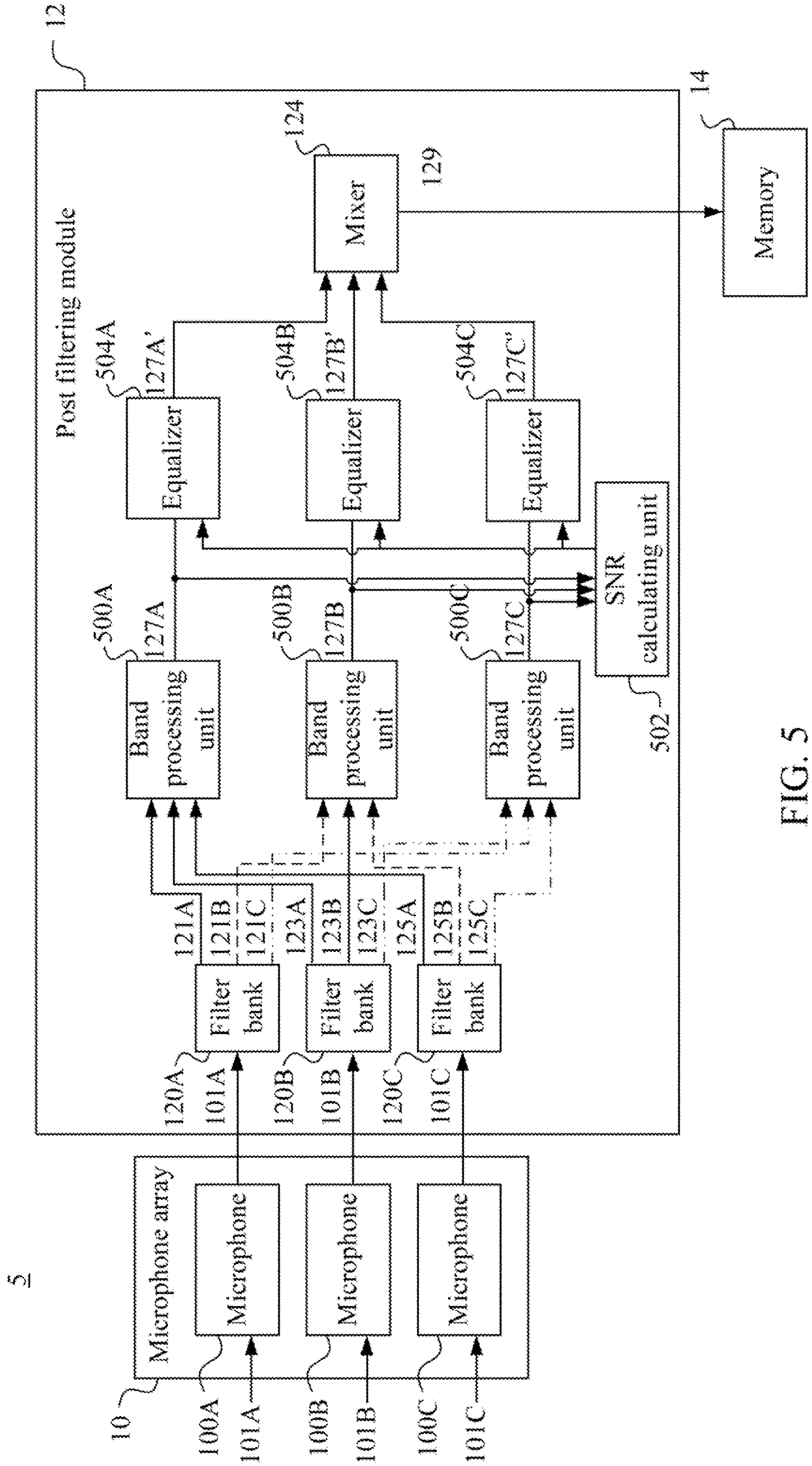
FIG. 5 is block diagram of a sound processing device in an embodiment of the present invention.

FIG. 5 is block diagram of a sound processing device 5 in an embodiment of the present invention.

Identical to the sound processing device 1 illustrated in FIG. 1, the sound processing device 5 includes a microphone array 10 and a post filtering module 12. Nevertheless, besides the filter banks 120A-120C and the mixer 124, the post filtering module 12 includes a plurality of band processing units 500A-500C instead of the comparators 122A-122C illustrated in FIG. 1. Further, the post filtering module 12 includes a signal and noise ratio (SNR) calculating unit 502 and equalizers 504A-504C.

Each of the band processing units 500A-500C is configured for receiving one of the filtered signals that correspond to a specific frequency band in each group of the filtered signals. For example, the band processing unit 500A receives the filtered signals 121A, 123A and 125A. The band processing unit 500B receives the filtered signals 121B, 123B and 125B. The band processing unit 500C receives the filtered signals 121C, 123C and 125C.

The band processing units 500A-500C are further configured for generating one of the band signals 127A-127C based on a weighted mean of the received filtered signals calculated according to a plurality of weighting factors related to a noise intensity of the specific frequency band.

When the frequencies of the specific frequency band are lower, the noise intensity is higher such that one of the weighting factors corresponding to one of the received filtered signals having a higher intensity is lower.

Take the band processing unit 500A for example, the band processing unit 500A calculates the weighted mean of the received filtered signals 121A, 123A and 125A to generate the band signal 127A. In an embodiment, the values of the filtered signals 121A, 123A and 125A are represented by $S_{1a}$, $S_{2a}$ and $S_{3a}$.

The value $O_a$ of the band signal 127A is expressed by: $O_a=k_{1a}S_{1a}+k_{2a}S_{2a}k_{3a}S_{3a}$, wherein $k_{1a}$, $k_{2a}$ and $k_{3a}$ are the weighting factors. If the value $S_{1a}$ is the largest and the value $S_{3a}$ is the smallest, since the noise intensity is highest according to the noise correlation between the frequency bands illustrated above, the weighting factor $k_{1a}$ is determined to be the lowest and the weighting factor $k_{3a}$ is determined to be the highest. The influence of the noise is suppressed accordingly.

On the other hand, when frequencies of the specific frequency band are higher, the noise intensity is lower such that one of the weighting factors corresponding to one of the received filtered signals having a larger intensity is larger.

Take the band processing unit 500C for example, the band processing unit 500C calculates the weighted mean of the received filtered signals 121C, 123C and 125C to generate the band signal 127C. In an embodiment, the values of the filtered signals 121C, 123C and 125C are represented by $S_{1c}$, $S_{2c}$ and $S_{3c}$.

The value $O_c$ of the band signal 127C is expressed by: $O_c=k_{1c}S_{1c}+k_{2c}S_{2c}+k_{3c}S_{3c}$, wherein $k_{1c}$, $k_{2c}$ and $k_{3c}$ are the weighting factors. If the value $S_{1c}$ is the largest and the value $S_{3c}$ is the smallest, since the noise intensity is lowest according to the noise correlation between the frequency bands illustrated above, the weighting factor $k_{3c}$ is determined to be the lowest and the weighting factor $k_{1c}$ is determined to be the highest. The actual sound signal is included accordingly.

Yet on the other hand, when frequencies of a specific frequency band are within a medium range, the noise intensity medium too such that the one of the received filtered signals having a medium intensity is selected.

Take the band processing unit 500B for example, the band processing unit 500C calculates the weighted mean of the received filtered signals 121B, 123B and 125B to generate the hand signal 127B. In an embodiment, the values of the filtered signals 121B, 123B and 125B are represented by $S_{1b}$, $S_{2b}$ and $S_{3b}$.

The value $O_b$ of the band signal 127B is expressed by: $O_b=k_{1b}S_{1b}+k_{2b}S_{2b}+k_{3b}S_{3b}$, wherein $k_{1b}$, $k_{2b}$ and $k_{3b}$ are the weighting factors. If the value $S_{1b}$ is the largest and the value $S_{3b}$ is the smallest, since the noise intensity is medium according to the noise correlation between the frequency bands illustrated above, the weighting factor $k_{2c}$ is determined to be the largest, and the weighting factors $k_{1c}$ and $k_{2c}$ can be other values lower than the weighting factor $k_{2c}$. The influence of the noise is suppressed and the actual sound signal is included accordingly.

In an embodiment, after the band signals 127A-127C are generated, the signal and noise ratio calculating unit 502 further calculates a signal and noise ratio based on a ratio between a first part and a second part of the band signals 127A-127C.

In an embodiment, the first part of the band signals 127A-127C corresponds to the frequency bands larger than a predetermined frequency, such as larger than 100 hertz. As a result, band signals 127B and 127C are the first part of the band signals 127A-127C including more of the actual sound signal.

On the other hand, the second part of the band signals 127A-127C corresponds to the frequency bands not larger than the predetermined frequency, such as not larger than 100 hertz. As a result, band signals 127A is the second part of the band signals 127A-127C including more of the noise.

The signal and noise ratio are thus determined based on the ratio between the first part and the second part of the band signals 127A-127C. When the signal and noise ratio is not smaller than a threshold value, the equalizers 504A-504C are bypassed such that the calculated band signals 127A-127C are directed added by the mixer 124 to generate the output sound signal 129.

When the signal and noise ratio is smaller than the threshold value, the equalizers 504A-504C are activated. The equalizers 504A-504C are configured for equalizing the band signals 127A-127C based on the frequency bands corresponding thereto. For example, the band signals 127A-127B can be either amplified or kept being the same values while the band signal 127C is suppressed to a half of the original value to increase the signal and noise ratio therebetween. In another example, the band signals 127A-127B can be kept being the same values while the band signal 127C is suppressed to one-third of the original value.

The equalized band signals 127A'-127C' are further added by the mixer 124 to generate the output sound signal 129.

It is noted that in some embodiments, the band signals 127A-127C can be generated by using a combination of the operation of the comparators 122A-122C and the band processing units 500A-500C. For example, the band signals 127A and 127C can be generated by the comparators 122A and 122C respectively, in which the band signal 127B can be generated by the band processing units 500B by setting each of the weighting factors $k_{1b}$, $k_{2b}$, and $k_{3b}$ to be ⅓.

Figure 6:
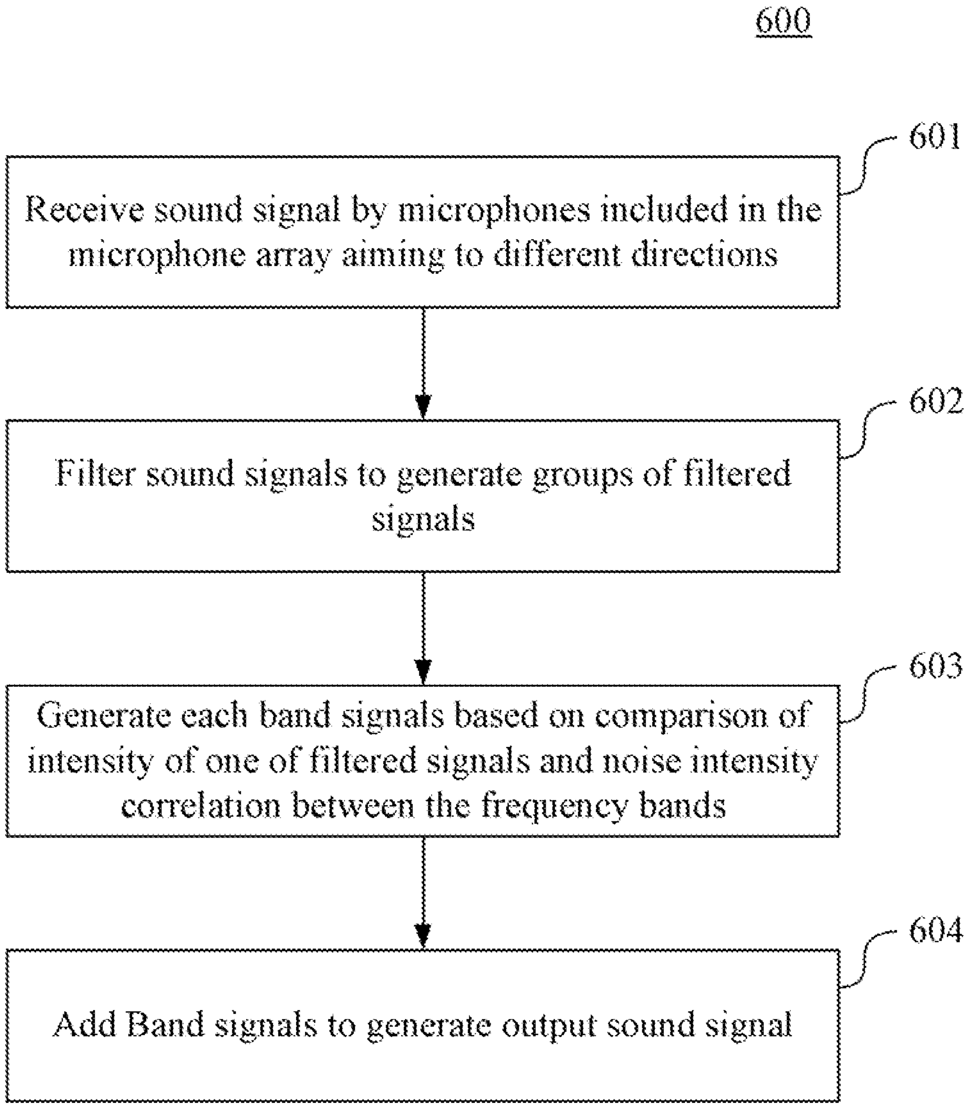
FIG. 6 is a flow chart of a sound processing method in an embodiment of the present invention.

FIG. 6 is a flow chart of a sound processing method 600 in an embodiment of the present invention. The sound processing method 600 is used in either the sound processing device 1 illustrated in FIG. 1 or the sound processing device 3 illustrated in FIG. 5. The sound processing method 600 includes the steps outlined below. The steps are not recited in the sequence in which the steps are performed. That is, unless the sequence of the steps is expressly indicated, the sequence of the steps is interchangeable, and all or part of the steps may be simultaneously, partially simultaneously, or sequentially performed.

In step 601, sound signals 101A-101C are received by microphones 100A-100C included in the microphone array 10 aiming to different directions.

In step 602, the sound signals 101A-101C are filtered by the filter banks 120A-120C to generate groups of filtered signals 121A-121C, 123A-123C and 125A-125C each corresponding to one of the sound signals 101A-101C, wherein each of the filtered signals within a group corresponds to one of different frequency bands.

In step 603, each of the band signals 127A-127C is generated by the comparators 122A-122C or the band processing units 300A-300C based on the comparison of the intensity of one of the filtered signals that corresponds to the same one of the frequency bands in each group of the filtered signals 121A-121C, 123A-123C and 125A-125C and the noise intensity correlation between the frequency bands.

In step 604, the band signals 127A-127C are added by the mixer 124 to generate the output sound signal 129.

Figure 7:
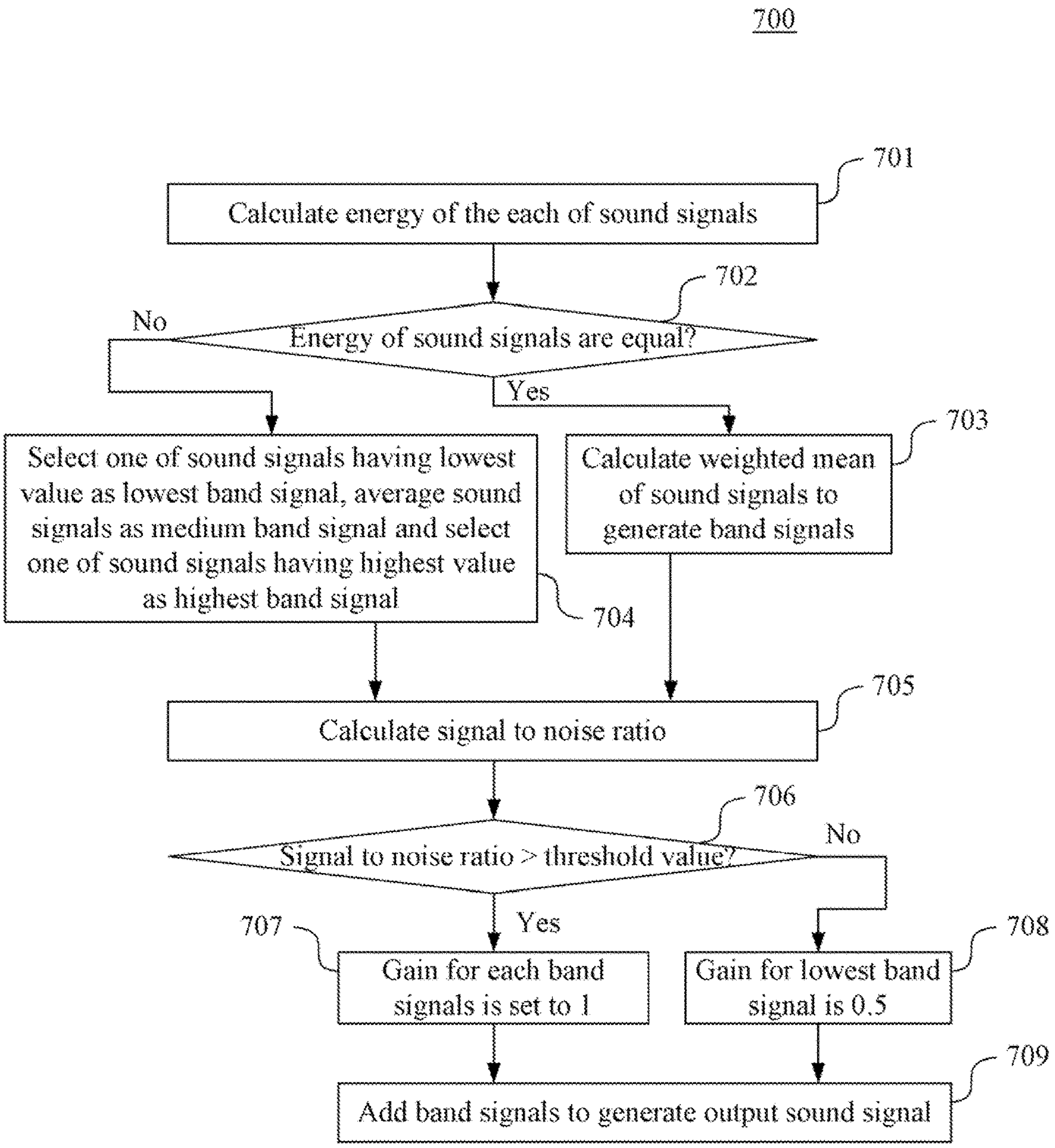
FIG. 7 is a flow chart illustrating the operation of the combination of the comparators in FIG. 1 and the noise ratio calculating unit and the equalizers in FIG. 5 in an embodiment of the present invention.

It is appreciated that each of the above embodiments can be implemented with other embodiments. For example, reference is now made to FIG. 7, in which FIG. 7 is a flow chart illustrating the operation 700 of the combination of the comparators 122A-122C in FIG. 1 and the noise ratio calculating unit 502 and the equalizers 504A-504C in FIG, 5 in an embodiment of the present invention.

In step 701, the energy of the each of the sound signals 101A-101C. re calculated. In an embodiment, the energy of the sound signals 101A-101C, can be calculated by an independent calculating module (not illustrated).

In step 702, whether the energy of the sound signals 101A-101C are equal is determined.

When the energy of the sound signals 101A-101C are equal, the comparators 122A-122C generate the band signals 127A-127C by calculating the weighted mean of the sound signals 101A-101C in step 703.

On the other hand, when the energy of the sound signals 101A-101C are not equal, the comparator 122A that corresponds to the lowest frequency band select one of the sound signals 101A-101C that has the lowest value as the lowest band signal 127A, the comparator 122B that corresponds to the medium frequency band averages the sound signals 101A-101C as the medium band signal 127B and the comparator 122C that corresponds to the highest frequency band select one of the sound signals 101A-101C that has the highest value as the highest band signal 127C in step 704.

The flow goes to step 705 after either the step 703 or 704 is performed, in which in step 705, the signal and noise ratio calculating unit 502 calculates the signal and noise ratio based on the ratio between a first part and a second part of the band signals 127A-127C, in which in an embodiment, the first part is the sum of the energy of the band signals 127B and 127C and the second part is the energy of the band signal 127A.

In step 706, whether the signal and noise ratio is larger than a threshold value is determined.

When the signal and noise ratio is larger than the threshold value, the gain of each of the equalizers 504A-504C is 1 in step 707.

When the signal and noise ratio is smaller than the threshold value, the gain of the equalizer 504A is set to be 0.5 and the gain of each the other equalizers 504B and 504C is set to be 1 in step 708.

In step 709, the equalized band signals 127A-127C are directed added by the mixer 124 to generate the output sound signal 129.

Figure 8:
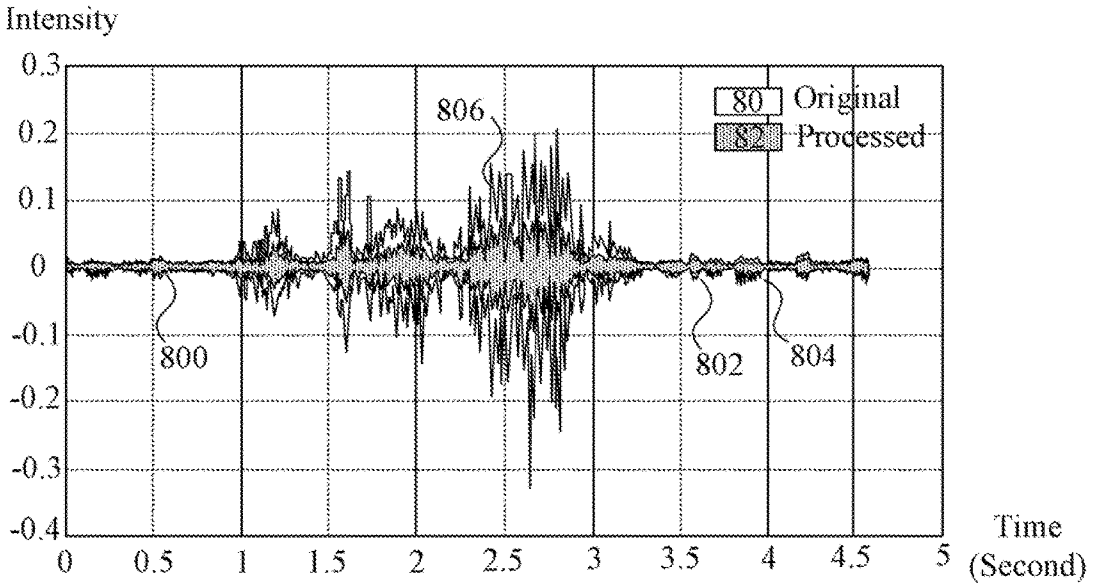
FIG. 8 is a diagram of simulation results of the waveforms of an original sound signal and an output sound signal generated by the sound processing device in an embodiment of the present invention.

FIG. 8 is a diagram of simulation results of the waveforms of an original sound signal 80 and an output sound signal 82 (illustrated as "processed" in FIG. 8) generated by the sound processing device, e.g. the sound processing device 1 in an embodiment of the present invention.

In FIG. 8, the horizontal axis corresponds to the time in the unit of such as, but not limited to seconds. The vertical axis corresponds to the intensity of the signal.

As illustrated in FIG. 8, the original sound signal 80 includes exemplary speech parts 800, 802 and 804 and a large wind noise part 806. After the processing of the sound processing device based on the received original sound signal 80, the output sound signal 82 greatly suppresses the wind noise part 806 while keeps the speech parts 800, 802 and 804 at an intensity similar to that in the original sound signal 80. The sound processing device 1 in the present invention can greatly reduce the impact of the noise in the environment.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A sound processing device comprising:

a microphone array comprising a plurality of microphones aiming to different directions and configured for receiving a plurality of sound signals; and a post filtering module configured for:

receiving the sound signals from the microphone array;

filtering the sound signals to generate a plurality of groups of filtered signals each corresponding to one of the sound signals, wherein each of the filtered signals within a group corresponds to one of a plurality of different frequency bands;

for the filter signals that correspond to a specific frequency band in each group of the filtered signals, comparing intensities of the filtered signals such that one of the filtered signals having a larger intensity is selected for a high frequency band comparator and one of the filtered signals having a lower intensity is selected for a low frequency band comparator to generate one of a plurality of band signals; and adding the band signals to generate an output sound signal.

2. The sound processing device of claim 1, wherein the post filtering module further comprises a plurality of filter banks each configured for filtering one of the sound signals to generate one group of the filtered signals.

3. The sound processing device of claim 2, wherein each of the filter banks is a finite impulse response (FIR) filter that processes one of the sound signals on a time domain.

4. The sound processing device of claim 1, wherein the post filtering module further comprises a plurality of comparators each configured for:

receiving one of the filtered signals that correspond to the specific frequency band in each group of the filtered signals;

comparing the intensity of the received filtered signals;

selecting one of the received filtered signals as one of the band signals based on a noise intensity correlation of the specific frequency band;

wherein when frequencies of the specific frequency band are higher, the noise intensity is lower such that the one of the received filtered signals having the larger intensity is selected;

when the frequencies of the specific frequency band are lower, the noise intensity is higher such that the one of the received filtered signals having the lower intensity is selected.

5. The sound processing device of claim 1, wherein the post filtering module further comprises a plurality of equalizers configured for equalizing the band signals based on the frequency bands corresponding thereto.

6. The sound processing device of claim 5, wherein the post filtering module further comprises a signal and noise ratio (SNR) calculating unit configured for:

calculating a signal and noise ratio based on a ratio between a first part and a second part of the band signals, wherein the first part of the band signals corresponds to the frequency bands larger than a predetermined frequency and the second part of the band signals corresponds to the frequency bands not larger than the predetermined frequency; and activating the equalizers when the SNR ratio is smaller than a threshold value.

7. The sound processing device of claim 1, wherein an angle between each two of the directions of the microphones are larger than 90 degrees.

8. The sound processing device of claim 1, wherein the post filtering module further comprises a mixer configured for adding the band signals to generate an output sound signal.

9. A sound processing method comprising:

receiving a plurality of sound signals by a plurality of microphones comprised in a microphone array aiming to different directions;

filtering the sound signals to generate a plurality of groups of filtered signals each corresponding to one of the sound signals, wherein each of the filtered signals within a group corresponds to one of a plurality of different frequency bands;

for the filtered signals that correspond to a specific frequency band in each group of the filtered signals, comparing intensities of the filtered signals such that one of the filtered signals having a larger intensity is selected for a high frequency band comparator and one of the filtered signals having a lower intensity is selected for a low frequency band comparator to generate one of a plurality of band signals; and adding the band signals to generate an output sound signal.

10. The sound processing method of claim 9, wherein the sound signals are filtered to generate one group of the filtered signals by a plurality of filter banks each being a finite impulse response filter that processes one of the sound signals on a time domain.

11. The sound processing method of claim 9, further comprising:

receiving one of the filtered signals that correspond to the specific frequency band in each group of the filtered signals;

comparing the intensity of the received filtered signals;

selecting one of the received filtered signals as one of the band signals based on a noise intensity correlation of the specific frequency band;

wherein when frequencies of the specific frequency band are higher, the noise intensity is lower such that the one of the received filtered signals having the larger intensity is selected;

when the frequencies of the specific frequency band are lower, the noise intensity is higher such that the one of the received filtered signals having the lower intensity is selected.

12. The sound processing method of claim 9, further comprising:

equalizing the band signals based on the frequency bands corresponding thereto.

13. The sound processing method of claim 12, further comprising:

calculating a signal and noise ratio based on a ratio between a first part and a second part of the band signals, wherein the first part of the band signals corresponds to the frequency bands larger than a predetermined frequency and the second part of the band signals corresponds to the frequency bands not larger than the predetermined frequency; and activating the equalizers when the SNR ratio is smaller than a threshold value.

14. The sound processing method of claim 9, wherein an angle between each two of the directions of the microphones are larger than 90 degrees.

15. The sound processing method of claim 9, wherein the band signals are added to generate an output sound signal by a mixer.

16. A sound processing device comprising:

a microphone array comprising a plurality of microphones aiming to different directions and configured for receiving a plurality of sound signals; and a post filtering module configured for:

receiving the sound signals from the microphone array;

filtering the sound signals to generate a plurality of groups of filtered signals each corresponding to one of the sound signals, wherein each of the filtered signals within a group corresponds to one of a plurality of different frequency bands;

for the filtered signals that correspond to a specific frequency band in each group of the filtered signals, assigning weighting factors to the filtered signals such that one of the filtered signals having a larger intensity is assigned to a larger one of the weighting factors for a high frequency band comparator and one of the filtered signals having a lower intensity is assigned to a lower one of the weighting factors for a low frequency band comparator to generate one of a plurality of band signals based on a weighted mean of the filtered signals; and adding the band signals to generate an output sound signal.

17. The sound processing device of claim 16, wherein the post filtering module further comprises a plurality of band processing units each configured for:

receiving one of the filtered signals that corresponds to the specific frequency band in each group of the filtered signals;

generating one of the band signals based on the weighted mean of the received filtered signals calculated according to the weighting factors related to a noise intensity of the specific frequency band;

wherein when frequencies of the specific frequency band are higher, the noise intensity is lower such that one of the weighting factors corresponding to one of the received filtered signals having the larger intensity is larger;

when the frequencies of the specific frequency band are lower, the noise intensity is higher such that one of the weighting factors corresponding to one of the received filtered signals having the larger intensity is lower.

18. A sound processing method comprising:

receiving a plurality of sound signals by a plurality of microphones comprised in a microphone array aiming to different directions;

filtering the sound signals to generate a plurality of groups of filtered signals each corresponding to one of the sound signals, wherein each of the filtered signals within a group corresponds to one of a plurality of different frequency bands;

for the filtered signals that correspond to a specific frequency band in each group of the filtered signals, assigning weighting factors to the filtered signals such that one of the filtered signals having a larger intensity is assigned to a larger one of the weighting factors for a high frequency band comparator and one of the filtered signals having a larger intensity is assigned to a lower one of the weighting factors for a low frequency band comparator to generate one of a plurality of band signals based on a weighted mean of the filtered signals; and adding the band signals to generate an output sound signal.

19. The sound processing method of claim 18, further comprising:

receiving one of the filtered signals that corresponds to the specific frequency band in each group of the filtered signals;

generating one of the band signals based on the weighted mean of the received filtered signals calculated according to the weighting factors related to a noise intensity of the specific frequency band;

wherein when frequencies of the specific frequency band are higher, the noise intensity is lower such that one of the weighting factors corresponding to one of the received filtered signals having the larger intensity is larger;

when the frequencies of the specific frequency band are lower, the noise intensity is higher such that one of the weighting factors corresponding to one of the received filtered signals having the larger intensity is lower.

* * * * *